US011418592B2

United States Patent
Li et al.

(10) Patent No.: US 11,418,592 B2
(45) Date of Patent: Aug. 16, 2022

(54) UPLOADING USER AND SYSTEM DATA FROM A SOURCE LOCATION TO A DESTINATION LOCATION

(71) Applicant: MICROSOFT TECHNOLOGY LICENSING, LLC, Redmond, WA (US)

(72) Inventors: Shiliang Li, Beijing (CN); Bei Lu, Beijing (CN); Shanming Xuan, Beijing (CN); Kuntao Yu, Beijing (CN); Jiajie Zhong, Guangdong (CN); Zhigang Zhuang, Beijing (CN); Jay D. Austin, Jr., Stockholm (SE); Hai-Yun He, Beijing (CN); Yunquan Peng, London (GB)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/939,787

(22) Filed: Jul. 27, 2020

(65) Prior Publication Data

US 2020/0358850 A1 Nov. 12, 2020

Related U.S. Application Data

(63) Continuation of application No. 15/553,551, filed as application No. PCT/CN2015/073480 on Mar. 2, 2015.

(51) Int. Cl.
G06F 13/00 (2006.01)
H04L 67/1097 (2022.01)
(Continued)

(52) U.S. Cl.
CPC ........ *H04L 67/1097* (2013.01); *G06F 16/258* (2019.01); *H04L 67/06* (2013.01); *H04L 67/2828* (2013.01)

(58) Field of Classification Search
CPC . H04L 67/1097; H04L 67/2828; H04L 67/06; H04L 9/00; H04L 9/06; H04L 9/0643; G06F 16/258
(Continued)

(56) References Cited

U.S. PATENT DOCUMENTS 8,139,249 B2 * 3/2012 Venable ............. H04N 1/00933
358/1.15
8,302,077 B2 * 10/2012 Manczak ................. G06F 8/71
717/121

(Continued)

FOREIGN PATENT DOCUMENTS

CN 102999537 A 3/2013

OTHER PUBLICATIONS

"Second Office Action and Search Report Issued in Chinese Patent Application No. 201580072762.5", dated Oct. 12, 2020, 16 Pages.

*Primary Examiner* — Kenneth R Coulter
(74) *Attorney, Agent, or Firm* — Newport IP, LLC; Leonard J. Hope (57) ABSTRACT

Automated uploading of user and system data from one or more source computing systems to one or more destination storage repositories is provided. A data uploader module is installed on each computing system or is accessible by each computing system from which user and/or system data may need to be exported to a destination repository. Upon command, a data uploader module reads desired user data or system data from the computing system. The read data is transformed, if required, and the data is then exported to a destination storage repository. The exported data may be stored and analyzed at the destination storage repository (Continued)

from which it may be subsequently exported to other destinations, including back to the source computing system from which it was originally extracted.

18 Claims, 7 Drawing Sheets

(51) Int. Cl.
  *G06F 16/25* (2019.01)
  *H04L 67/5651* (2022.01)
  *H04L 67/06* (2022.01)
(58) Field of Classification Search
  USPC ...... 709/217–219, 220–222; 726/16–21, 2–6
  See application file for complete search history.

(56) References Cited

U.S. PATENT DOCUMENTS

| | | | |
|---|---|---|---|
| 10,282,213 B2* | 5/2019 | O'Connor | G06F 9/44505 |
| 10,757,186 B2* | 8/2020 | Li | H04L 67/1097 |
| 2009/0006610 A1* | 1/2009 | Venable | H04N 1/00795 |
| | | | 709/224 |
| 2010/0235813 A1* | 9/2010 | Manczak | G06F 8/71 |
| | | | 717/121 |
| 2014/0358549 A1* | 12/2014 | O'Connor | G06F 9/44505 |
| | | | 704/270 |

\* cited by examiner

Mobile Computing Device

UPLOADING USER AND SYSTEM DATA FROM A SOURCE LOCATION TO A DESTINATION LOCATION

CROSS-REFERENCE TO RELATED APPLICATION

This application is a continuation of U.S. Non-Provisional patent application Ser. No. 15/553,551, now U.S. Pat. No. 10,757,186, filed Aug. 24, 2017, which is a U.S. National Stage Application of PCT/CN2015/073480, filed Mar. 2, 2015. The disclosures of these applications are hereby incorporated by reference in their entirety into the present application. To the extent appropriate, a claim of priority is made to the above disclosed applications.

BACKGROUND

In modern computing systems, large amounts of data are generated and stored on one or more computers in association with databases, electronic mail systems, web services systems, online software provision systems, document management systems, and the like. In some cases, large data centers house hundreds or even thousands of computers on which are run various software applications and on which are stored data of many types for one or more computing system users. For example, a large data center may be used for processing and storing data of various types for hundreds, thousands or more individual users, companies, educational entities, or any other entity for which data may be processed and stored. There is often a need for extracting user data, as well as, computer system identification and operating information data from such computers for analysis by computing systems and services providers or by owners of such data. However, extracting user data and systems data from hundreds or thousands of computers operating in one or more data centers or distributed across large geographical areas is a difficult, time-consuming and inefficient process. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The above and other problems are solved by automated uploading of user and system data from one or more source computing systems to one or more destination storage repositories. According to aspects of the invention, a data uploader module is installed on each computing system or is accessible by each computing system from which user and/or system data may need to be exported to a destination repository.

Upon command, a data uploader module associated with a given computing system reads desired user data or system data from the computing system. The read data is transformed, if required (e.g. scrubbed of personally identifiable information), and the data is then exported to a destination storage repository. According to aspects of the invention, the exported data may be stored and analyzed at the destination storage repository from which it may be subsequently exported to other destinations, including back to the source computing system from which it was originally extracted.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, aspects of the present invention are directed to automated uploading of user and system data from one or more source computing systems to one or more destination storage repositories. As described in further detail below, according to aspects of the invention, a data uploader module is installed on each computing system or is accessible by each computing system from which user and/or system data may need to be exported to a destination repository. When a command is received for extracting user or system data from a given computer system (e.g., a given computer at a computing data center), the data uploader module installed on the computer or accessible by the computer reads a configuration file to determine data that is required from the associated computer. In addition, the data uploader determines from the configuration file any data types associated with the required data and determines a definition of and location of a reader plug-in module, a transformation plug-in module and/or an export plug-in module that may be utilized by the data uploader module for reading, transforming (if required) and exporting the required data from the associated source computer to a desired destination storage repository.

As will be described below, transformation of the data via the transformation plug-in module may include any desired transformation of the data, for example, scrubbing the data of personally identifiable information (PII), transforming the data from one data type to a second data type, extracting unnecessary components of the data, and the like as required by the owner of the data or as desired by a recipient of the data at the destination storage repository. Thus, according to aspects of the invention, data may be uploaded from one or many source computing devices, transformed as required and passed to one or more desired destination storage repositories for further analysis and use as desired.

Figure 1:
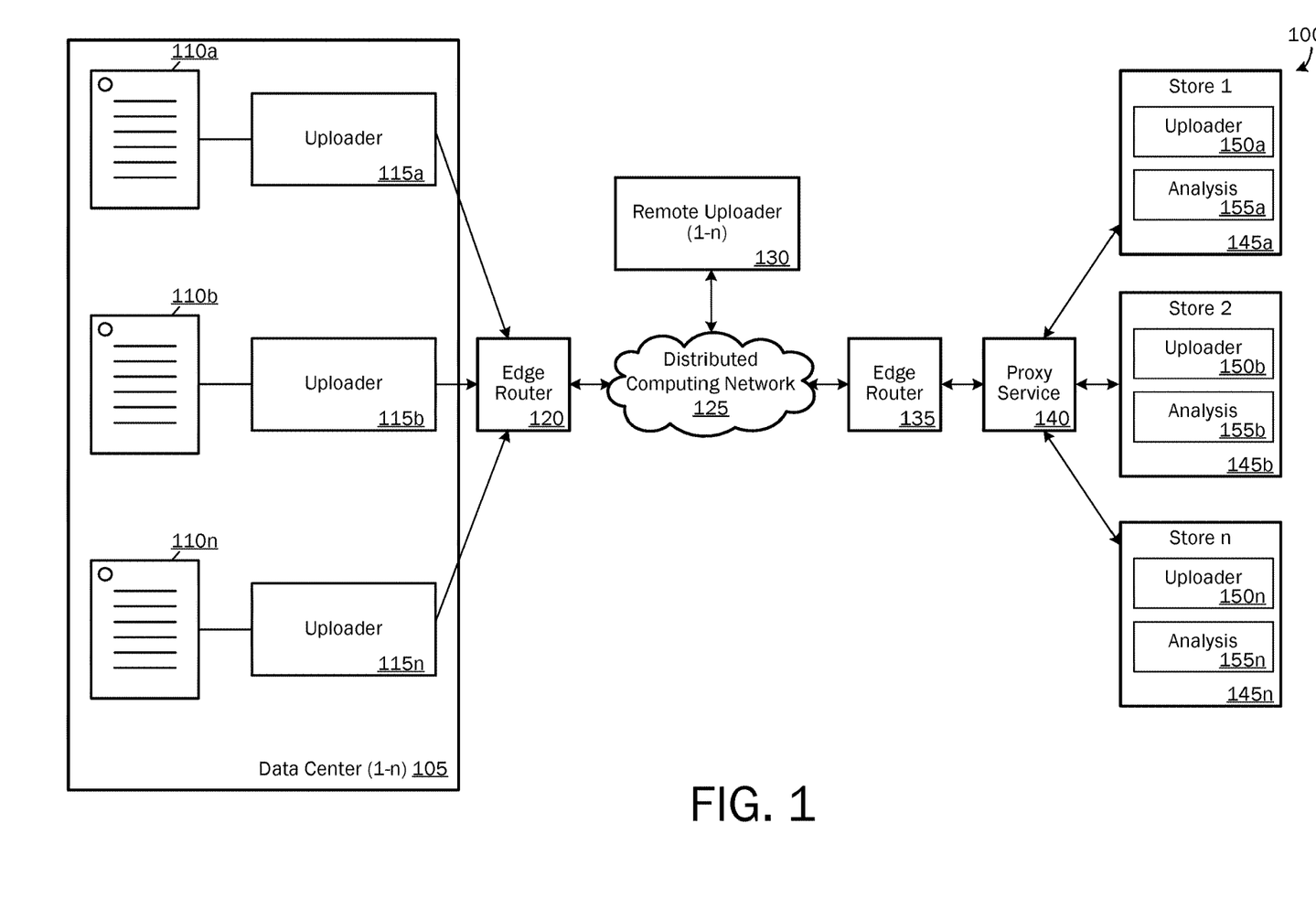
FIG. 1 is a simplified block diagram of one example of a system architecture for uploading data from a source location to a destination location.

FIG. 1 is a simplified block diagram of one example of a system architecture for uploading data from a source location to a destination location. The system architecture 100 is comprised of various example computing components for uploading data from a variety of source computing systems (or individual computers) to a variety of destination storage repositories. On the left side of FIG. 1, a data center 105 is illustrative of a data center in which may be housed hundreds, thousands or more individual computers or computing systems 110a, 110b, 110n on which may be stored data of a variety of data types that may be processed using a variety of different computing processes, for example, a variety of software applications. For example, each of the computing devices 110a, 110b, 110n may include computers of various types, for example, server computers, for storing user data in databases, electronic mail systems, document management systems, and the like, and the computing systems 110a, 110b and 110n may be used for running a variety of computing system software applications, for example, database applications, electronic mail systems applications, web services applications, online software provision applications, productivity applications, data management system applications, telecommunications applications, and the like.

As should be appreciated, the data center 105 is also illustrative of one of many data centers that may be co-located, or that may be located at different locations and that may be associated with each other via various transmission systems for passing data between disparate data centers. In addition, while the data center 105 is illustrated as a data center in which numerous computer systems 110a-n may be located for provision of data and services, as described above, the data center 105 is equally illustrative of a single computing device, for example, a desktop, laptop, tablet, handheld, or other computing device operated by an individual user from which user data and/or computer system data may be extracted, transformed (if required) and exported to a destination storage repository for analysis and further use, as desired.

Referring still to the data center 105, each computing device 110a-n is associated with an uploader module 115a, 115b, 115n, respectively, that is operative for uploading user and/or system data from each associated computer/computing system 110a-n and for transforming, if required, and exporting the extracted data to a designated destination storage repository. The uploader module 115a-n is described in further detail below with respect to FIG. 2. According to one aspect of the invention, an uploader module 115a-n may be installed on each associated computer/computing system 110a-n.

Alternatively, a single uploader module 115a may be operated as a standalone module that may be associated with a plurality of computing systems 110a-n. In such a case, the uploader module may operate as a remote uploader module 130 that may access one or more associated computing systems 110a-n through a distributed computing network, for example, the Internet or an intranet. That is, according to aspects of the invention, the uploader module 115a-n may be installed on an associated computing device 110a-n, or the uploader module may operate remotely of a computing device from which data may be extracted for transformation of the data, if required, and for exporting the data to a destination storage repository, as described herein.

Referring still to FIG. 1, and edge router 120 is illustrative of a typical router device for passing extracted data from a given uploader module to systems external to the data center 105. As should be appreciated, the edge router 120 may be responsible for ensuring that data passed from a given data center 105 is properly passed to a desired destination system component, for example, that packetized data passing from the uploader module is properly routed to a correct destination component of the system 100.

The distributed computing network 125 is illustrative of any network such as the Internet or an intranet through which data may be passed from the data center to components external to the data center such as destination storage repositories 145a-n, described below.

The edge router 135 is illustrative or a receiving edge router through which data may be passed to a proxy service 140 responsible for ensuring received data is properly authenticated prior to allowing received data to be passed to one or more destination storage repositories 145a-n.

The storage repositories 145a-n are illustrative of any data storage repository that may be authorized to receive data uploaded via the uploader modules 115a-n. For example, the destination storage repositories 145a-n may be associated with a services provider for storing and analyzing data associated with computing systems and software services provided for customers of the services provider. For example, the storage repository 145a may be designated for receiving user data and computing system data associated with electronic mail services provided by a given services provider. The storage repository 145b may be designated for receiving and analyzing user data and systems data associated with web services of a given services provider. Similarly, the destination storage repository 145n may be associated with online software provision, for example, provision of word processing services, slide presentation application services, database application services, spreadsheet application services, telecommunications application services, and the like provided to various users via one or more online software application services systems.

As should be appreciated, each of the destination storage repositories 145a-n may be associated with different services providers or with different requesters of user and/or computing system data. For example, the repository 145a may be associated with a first telecommunications or software application services provider, the repository 145b may be associated with a second services provider, and so on.

As will be understood by those skilled in the art, providers of computing system services, data management services, online software application services, web services, and the like often need to examine, analyze and otherwise manage computing systems data and user data to ensure that data and computing systems services are operating and being maintained as required. For example, a provider of online software services may need to periodically audit the operating functionalities and capabilities of hundreds or thousands of server computers 110a-n maintained at a large data center 105. Likewise, a provider of online software services may need to monitor user data stored on such data center systems to ensure that user data is being properly processed as required by services agreements between the services provider and various customers. In such a case, operating data and/or used data from a given computer may be extracted by an associated uploader module 115a according to any data type associated with the extracted data and may be passed to and stored at a desired storage repository 145a-n for analysis by a requesting services provider or user.

Before the data is passed to the destination storage repository, the data may require transformation for a variety of reasons. For example, if the data contains sensitive confidential and/or personal information associated with a given user, for example, the user's name, social security number, driver's license number, financial data, and the like, such personally identifiable information (PII) may be scrubbed from the data by the uploader module before the data is passed to the destination storage repository to prevent such personally identifiable information from being passed to an unauthorized person or entity. Similarly, if the data extracted from a given computer of computing system at the data center 105 is stored according to a first format, but the data will be stored at the desired destination storage repository according to a second format, the uploader module 115 may transform the data from the first format to the second format so that it may be properly stored and utilized at the destination storage repository.

For example, if a given destination storage repository is associated with a software application services provider, and the services provider would like to analyze a number of documents produced and stored at one or more computing devices at a data center 105, the services provider may require that any personally identifiable information be scrubbed from the data before it is passed to the storage repository for analysis and review because the services provider does not need nor want personally identifiable information about the document, but instead, the services provider may want to analyze other characteristics, attributes or properties of the document to ensure that the services provider's software applications with which the document was produced are operating properly.

In addition, the document may be stored at the computing system 110a-n according to a first format, for example, a database format, but the destination storage repository may need the document according to a second format. Just as the data may be scrubbed of PII, the data may be transformed in a variety of other ways, such as from the first format to the second format, before it is passed to and stored at the desired destination storage repository. Thus, according to aspects of the present invention, data may be extracted, transformed as required and exported from one or many computing devices or computing systems via an uploader module before it is passed to and stored at one or many destination storage repositories.

Referring still to FIG. 1, according to aspects of the present invention, each destination storage repository 145a-n may be equipped with or associated with uploader modules 150a, 150b, 150n that may be used for extracting, transforming, and storing user data and/or computing system data from computing systems 110a, 110b, 100 at the data center 105 remotely from the data center 105. That is, the uploader modules 150a through 150n may be operated from each requesting destination storage repository 145a, 145b, 145n for requesting, reading, transforming, and storing required user or computing system data. Thus, as described above, the uploader modules 115a, 115b, 115n may be installed on or associated with individual computing systems 110a through 110n, a remote uploader 130 may be used for reading, transforming, and exporting data via a distributing computing network that may be used for accessing desired computing systems 110a through 110n, or the uploader modules 150a, 150b, 150n may access required data remotely from individual destination storage repositories. Alternatively, the uploader modules 150a-n may be used from extracting, transforming and exporting data from the storage repositories 145a-n in the same manner as described for exporting data from the computing systems 110a-n.

The analysis modules 155a, 155b, 155n are illustrative of software applications or other executable modules at the storage repositories 145a-n that may be utilized for analyzing, reporting, and exporting received data, as desired. For example, an analysis module 155a may be operative to analyze documents generated by provided online software services to ensure that such documents were properly saved at respective computing devices 110a-n, as required. An analysis module 155b may be illustrative of a software application or other executable module for analyzing electronic mail traffic for ensuring that electronic mail messages were generated and processed at an associated data center computing device 110a-n according to required electronic mail services processing. That is, any analysis module 155a-n may be utilized at a given destination storage repository for analyzing received data as required by the recipient of the data from the uploader modules 115a-n, 130, 150a-150n.

According to aspects of the invention, data that is stored at analyzed and otherwise utilized at any of the destination storage repositories 145a-145n may be subsequently exported to other destinations, as desired. For example, such data may be analyzed and reported to customers of one or more services providers for reporting periodically on processing performed by the services provider for the requesting customers. In addition, data stored at any of the destination storage repositories 145a-n may be passed back through the system 100 illustrated in FIG. 1 for storage back at the computing devices 110a-n from which the data was originally extracted.

Figure 2:
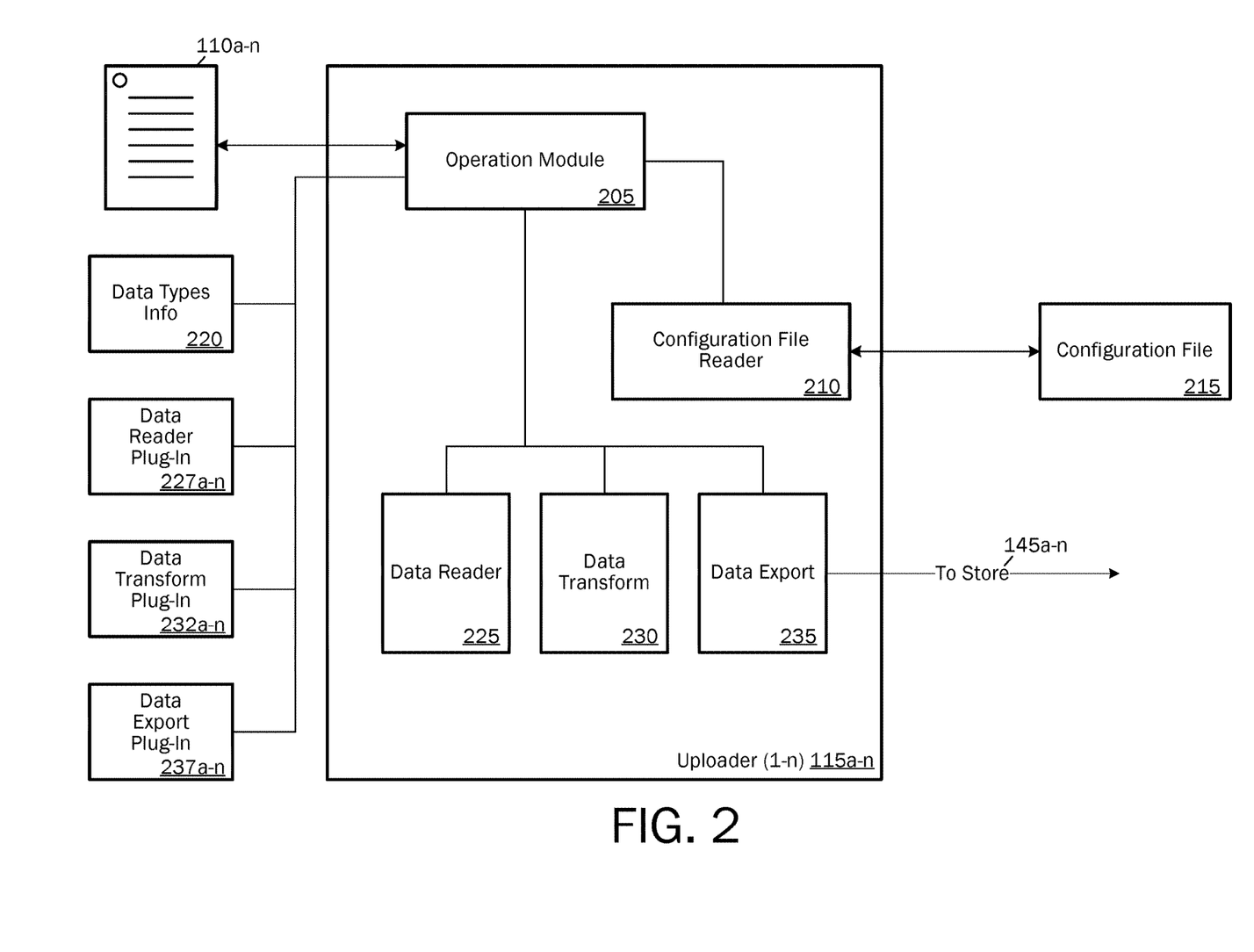
FIG. 2 is a simplified block diagram of one example of a data uploader module for uploading data from a source location to a destination location.

Referring now to FIG. 2, the data uploader 115a-n is illustrated and described. As briefly described above, the uploader 115a-n is a software application or software module containing sufficient computer executable instructions for reading, transforming (if required) and exporting data of a variety of data types from one or many data sources 110a-n to one or many data storage 145a-n. Referring to FIG. 2, the data uploader 115a-n includes an operation module 205 for receiving data upload instructions and for directing the processing of components of the data uploader module 115a-n. A configuration file reader 210 is a module with which the data uploader 115a-n reads a configuration file 215 for data uploading instructions, as described below. A data reader module 225 is operative to read data of a variety of data types via a data reader plug-in module 227a-n. A data transformation module 230 is a module operative for transforming data in response to data transformation information read from the configuration file 215 via a data transformation plug-in 232a-n. A data export module 235 is operative to export data from memory to a designated destination storage repository 145a-n as designated by instructions received from the configuration file 215 via the data export plug-in 237a-n.

That is, the data reader module 225, data transformation module 230, data export module 235 are modules of the data uploader module 115a-n operative to read, transform and export data of a variety of types as designated by information contained in the configuration file 215. And, each of the modules 225, 230, 235 may be enabled to read, transform and export data as instructed based on a variety of plug-ins 227, 232, 237 accessed by the data uploader operation module 205 or installed on the data uploader 115a-n to allow the uploader 115a-n to read, transform and export data according to a variety of data types 220 that are designated for uploading to a given destination storage repository 145a-n.

Various data reader, data transformation and data export plug-in modules 227, 232, 237 may be provided to the data uploaders 115a-n or may be accessed by the data loader modules 115a-n as required for different types of data reading transformation and export. For example, a services provider which needs to receive transformed data from various computing devices operated at a data center 105 may provide data reader plug-ins, data transformation plug-ins, and data export plug-ins for use by data uploader modules 115a-n for reading, transforming and exporting data according to their individual needs.

As should be appreciated, a given data uploader 115a-n may be installed on a given computing device 110a-n or may be otherwise associated with or provided access to a given computing device 110a-n, and the data uploader 115a-n may be enabled for reading data of many different types by associating a data reader plug-in 227a-n to allow the uploader 115a-n to read data of a designated type. Similarly, the uploader 115a-n may be enabled to transform data as desired by associating the uploader with a data transformation plug-in required for the desired transformation. Similarly, the uploader module 115a-n may be enabled to export data as desired by associating the uploader with an appropriate data export plug-in 237a-n.

Data that may be read, transformed, and exported, as described herein, may be of an almost limitless number of different data types. Such data may be in the form of operating systems events, text files, XML files, HTML files, contents of data bases (e.g., SQL databases), electronic mail files, calendaring information, word processing documents, spreadsheet documents, slide presentation documents, tasks documents and files, and the like. According to aspects of the present invention, the data uploader modules 115a-n may be enabled, as described herein, for transforming data from one file type to another file type, as required for exporting the data and storing the data at an appropriate storage location, as instructed by information provided via the configuration file 215. In addition to data types that may be read and transformed, other information may be provided in the configuration file, for example, information instructing the uploader to strip read data of certain unnecessary or undesired information. For example, a given document may contain text, photographs, images, tables, appendices, and the like. For a given data request, it may be desired that everything except the text contained in a given document be stripped from the document prior to exporting the document to a desired storage location. Thus, an appropriate transformation module may be utilized for stripping the undesired components of the document such that only the desired text components of the document are ultimately exported. Thus, as should be appreciated, data that is read by the uploader module 115a-n may be transformed as desired and as enabled by an appropriate data transformation plug-in 232a-n.

The configuration file 215 is illustrative of a file that may be accessed by the uploader module 115a-n for receiving data uploading instructions for a given set or type of data. Data uploading instructions contained in the configuration file may provide information including the data types associated with data to be uploaded, data reading instructions, as well as, security information for allowing the uploader module to access desired data. In addition, the configuration file may provide instructions on how desired data is to be transformed, if required, and instructions on where uploaded data is to be stored and in what file type exported data is to be stored.

Consider for example that a batch of user data is to be read from a computing device 110a contained in a data center 105 and is to be transformed from an extensible markup language (XML) format to a hypertext markup language (HTML) format so that the data may be passed to a desired storage repository for presenting to an analyzing user via an HTML-based web page. Consider also that personally identifiable information (PII) such as user name, user age, user social security number, user date of birth, and the like are to be stripped from or scrubbed from the data before it is passed to the designated destination storage repository 145a-n. According to this example, upon command, the data uploader 115a-n installed on, associated with, or enabled for access to the computing device 110a-n containing the desired data will first read a configuration file 215 for receiving instructions on reading, transforming, and exporting the desired data.

Upon reading the configuration file 215 via the configuration reader 210, the uploader module 115a-n will learn that the data is currently stored according to an XML format and that the data is to be transformed into an HTML format. Furthermore, the uploader module will learn that PII is to be stripped from the data during the transformation process before the data is exported to the desired storage repository. Based on this information from the configuration file 215, the operation module 205 will parse the data types 220 for information on the associated data types, for example, XML and HTML, for obtaining information on an appropriate data reader plug-in 227a-n, an appropriate data transformation plug-in 232a-n, and an appropriate data export plug-in 237a-n needed for reading, transforming and exporting the data according to the data types at issue. According to the present example, the operation module 205 will also obtain information associated with a data transformation plug-in necessary for scrubbing the data of the PII information as instructed by the configuration file 215.

Once the appropriate plug-ins 227, 232, 237 are identified, the operation module may cause the data reader module 225 in association with the appropriate data reader plug-in 227 to read the desired information from the associated computing device 110a-n. The operation module 205 may then cause the data transformation module 230 in association with the data type transformation module and the PII scrubbing module to transform the data, as desired. First, the appropriate transformation plug-in may transform the data from the example XML format to the example HTML format so that the data may be presented in a web page at the destination storage repository. Secondly, the appropriate data transformation plug-in required for scrubbing the data of PII may be utilized by the data transformation module 230 for identifying personally identifiable information and for scrubbing the information before the data is passed to the storage repository 145.

As well known to those skilled in the art, PII information may be scrubbed from a data file according to a variety of acceptable means. According to one method, identified PII information may be converted to a numeric string via a hashing operation so that the PII information may not be understood nor consumed by a downstream user or process. According to another method, identified PII information may be encrypted so that the information may be passed to a downstream user or process, but where the encrypted information may subsequently be de-encrypted, as desired. After the desired data is read, and transformed as required in accordance with information contained in the configuration file 215, the data then may be exported by the data export module 235 in association with an appropriate data export plug-in 237 to a designated destination storage location.

Figure 3:
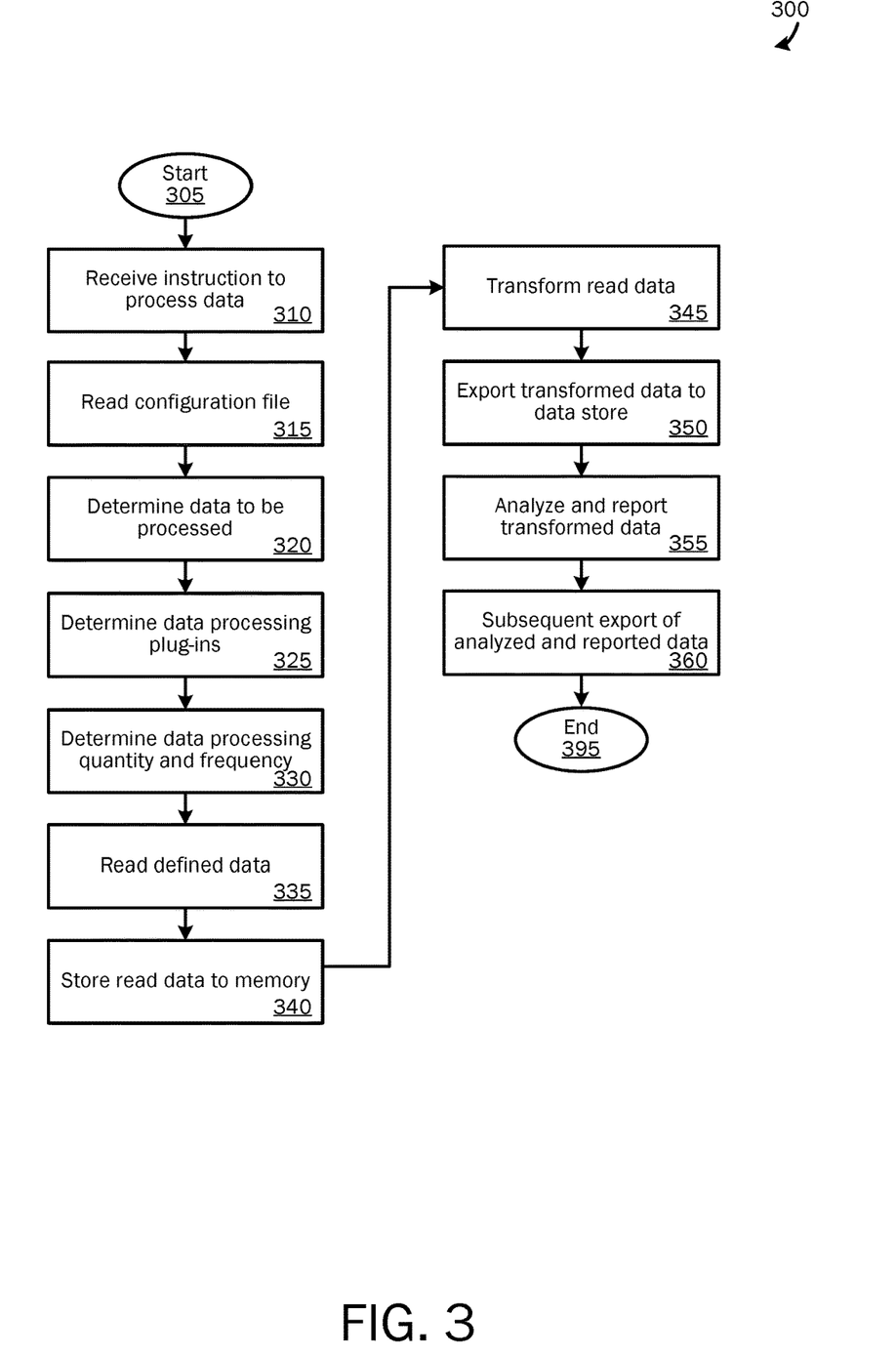
FIG. 3 is a flowchart of an example method for uploading data from a source location to a destination location.

Having described an example system architecture for aspects of the present invention above with respect to FIGS. 1 and 2, FIG. 3 is a flowchart of an example method for uploading data from a source location to a destination location. The method 300 begins at start operation 305 and proceeds to operation 310 where instructions are received to read, transform and export computer system or user data from a given computing device 110*a-n* to a designated storage repository 145*a-n*, as described above. Consider for example, that a provider of online software application services desires to receive a number of user documents stored at a computer device 110*a* at the service provider's storage location 145*a* so that the documents may be analyzed for processing errors so that required technical modifications or updates may be made to prevent such processing errors in the future. According to this example, consider that the service provider desires that the documents be stripped of any personally identifiable information associated with the document authors before the documents are exported to the service provider's storage location 145*a*. As should be appreciated, in addition to user data, information about the operation of the computing device itself may be requested for export to a given storage location. For example, information on various operating system events fired over a given period of time may be requested, information on access to peripheral devices by the computing device may be requested, and the like. In response to the instructions from the services provider, a configuration file 215 is generated that will provide information to the associated data uploader 115*a* for reading, transforming and exporting the desired documents.

At operation 315, the data uploader 115*a* reads the configuration file 215 via the configuration file reader module 210. At operation 320, the data uploader module 115*a* determines the data to be processed via the configuration file 215. According to the present example, the data uploader module 115 receives a list of documents to be read from the associated computing device 110*a*. At operation 325, in response to information contained in the configuration file 215, the uploader module 115*a* determines whether a given data reader plug-in 227*a-n* is needed for reading the desired documents, whether a given data transformation plug-in 232*a-n* is needed for scrubbing the documents of any personally identifiable information, and whether a particular data export plug-in 237*a-n* is needed for exporting the data to the desired storage location in accordance with information contained in the configuration file 215.

At operation 330, the data uploader module 115*a* determines the quantity and frequency of upload of the desired information. For example, based on information contained in the configuration file 215, the data uploader module 115*a* may be instructed to upload ten randomly selected word processing documents once every thirty minutes for a period of twenty-four hours to provide the requesting services provider a sampling of documents generated at the computing device 110*a* over a period of twenty-four hours. As should be appreciated, quantity and frequency of data processing by the data upload module may be defined according to many different properties. For example, the uploader may be instructed to read, transform and export data according to file size, for example, files no greater than ten megabytes in size, or the uploader may be instructed to process files according to the number of users accessing a given file, for example, retrieve all files accessed and/or edited by ten or more users. Thus, as should be appreciated, a variety of different instructions may be provided to the uploader module 115*a* for designating which data to process and how frequently to process the data.

At operation 335, the data uploader module 115*a* reads the desired data, for example, the desired documents, from the identified computing device 110*a* in accordance with information received from the configuration file 215 and via the data reader plug-in module 227. At operation 340, the read data is stored to memory for subsequent transformation and export operations.

At operation 345, the read and stored data is transformed based on information read from the configuration file 215 by the data transformation module 230 in association with an appropriate data transformation plug-in 232*a-n*, as described above. According to one aspect of the invention, a set of flags may be provided in the configuration file that defines how the read information is to be transformed. According to the present example, because the desired information is to be scrubbed of PII information, a PII scrubber plug-in 232*a* may be utilized for identifying and scrubbing PII information from the read documents. For example, according to instructions read from the configuration file 215, if a given read document contains ten columns of information, and it is identified that columns one, three and ten contain PII information, then the PII scrubber transformation module may be instructed to hash the data contained in columns one, three and ten so that the data may not be consumed or processed by downstream users or processes. Alternatively, the PII scrubber module may be caused to encrypt the data contained in those columns so that the data may not be consumed by downstream users or processes, but where the data may subsequently be de-encrypted, if desired.

As should be appreciated, transformation may be done according to various orders and file sizes of the read documents or other data items. For example, if a given set of data, for example documents, is to be read and transformed, when the uploader module is reading memory for obtaining the desired data items, the uploader module may start with the oldest file first, the uploader module may begin reading the first document, or the uploader module may read into a buffer until the limits of the buffer are reached or until the end of the file has been read. Once the file has been read and has been stored into memory, then the specified transformation may be applied as directed by the configuration file. Thus, based on the configuration file, the data may be transformed in a variety of ways.

For example, a transformation plug-in may be enabled to modify data read from a source computing system from a first state at the source computing system to a second state for upload to the destination computing system. Such modification may include removing personally identifiable information (PII) from the data read from the source computing system, performing calculations on the read data and transforming the read data to include results of the performed calculations, formatting the read data from a first formatting state to a second formatting state (e.g., XML to HTML), and converting the read data from a first file format to a second file format (e.g., flow format to fixed format and vice versa). As should be appreciated, these are only examples of transformations that may be made to read data before it us uploaded, and a transformation plug-in may be used for transforming the data in any way needed for the destination storage repository.

According to one aspect, as the uploader module is reading and transforming desired data, the data may be read and transformed according to data scans. For example, a data uploader may be directed to scan each of ten different storage locations associated with the computing device 110 every thirty minutes. Thus, according to this example, ten loads or chunks of data will be read, transformed and exported to the desired storage location every thirty minutes. According to one aspect of the invention, the data uploader module keeps track of the location in a given set of data items it is reading at any given time and the last place it successfully read data before it stopped for any reason, for example, where it temporarily stopped for transformation and export of previously read data. The data uploader may apply a bookmark or watermark to the last location it read data and a second bookmark or watermark for the last location at which it successfully uploaded read and transformed data. Thus, the data uploader module may know that, while it last read data to a certain point in a given memory location, the last point of successful transformation and upload may have occurred at an earlier location in memory if it is needed that the data uploader module go back to re-read and re-transform data if errors are determined downstream at the designated storage location 145a.

At operation 350, transformed data is exported to a desired storage location 145a-n as directed by information contained in the configuration file 215. At operation 355, the receiver of the read, transformed and exported data may analyze the data as desired for determining helpful information about the data, or for determining helpful information about the operation of the computing device 110a from which the data was read. At operation 360, the data may be subsequently exported to other locations for subsequent analysis and reporting, including subsequent export back to the computing device 110a from which it was originally extracted. The method 300 beings at operation 395.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
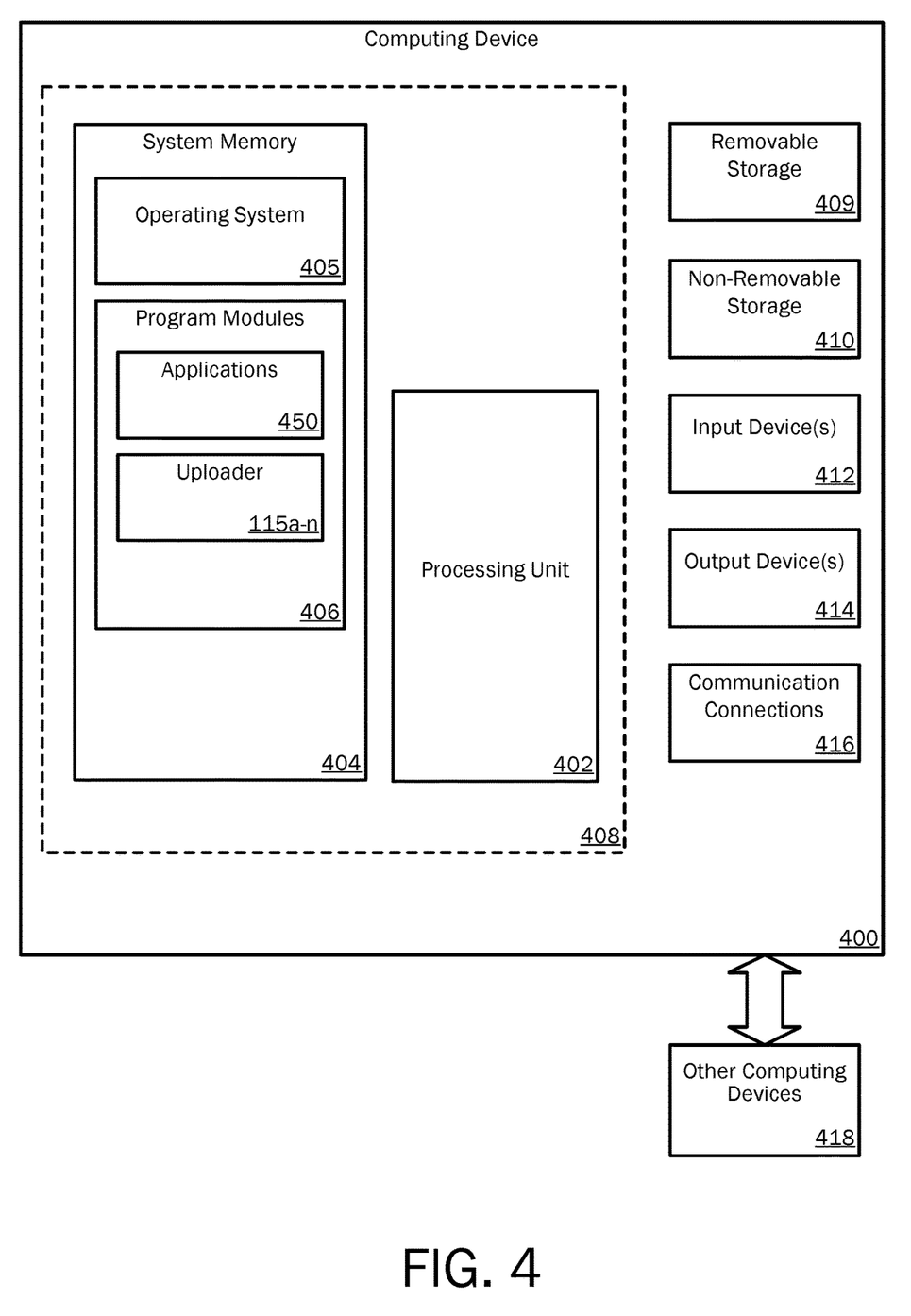
FIG. 4 is a block diagram illustrating example physical components of a computing device with which aspects of the present invention may be practiced.
Figure 5A:
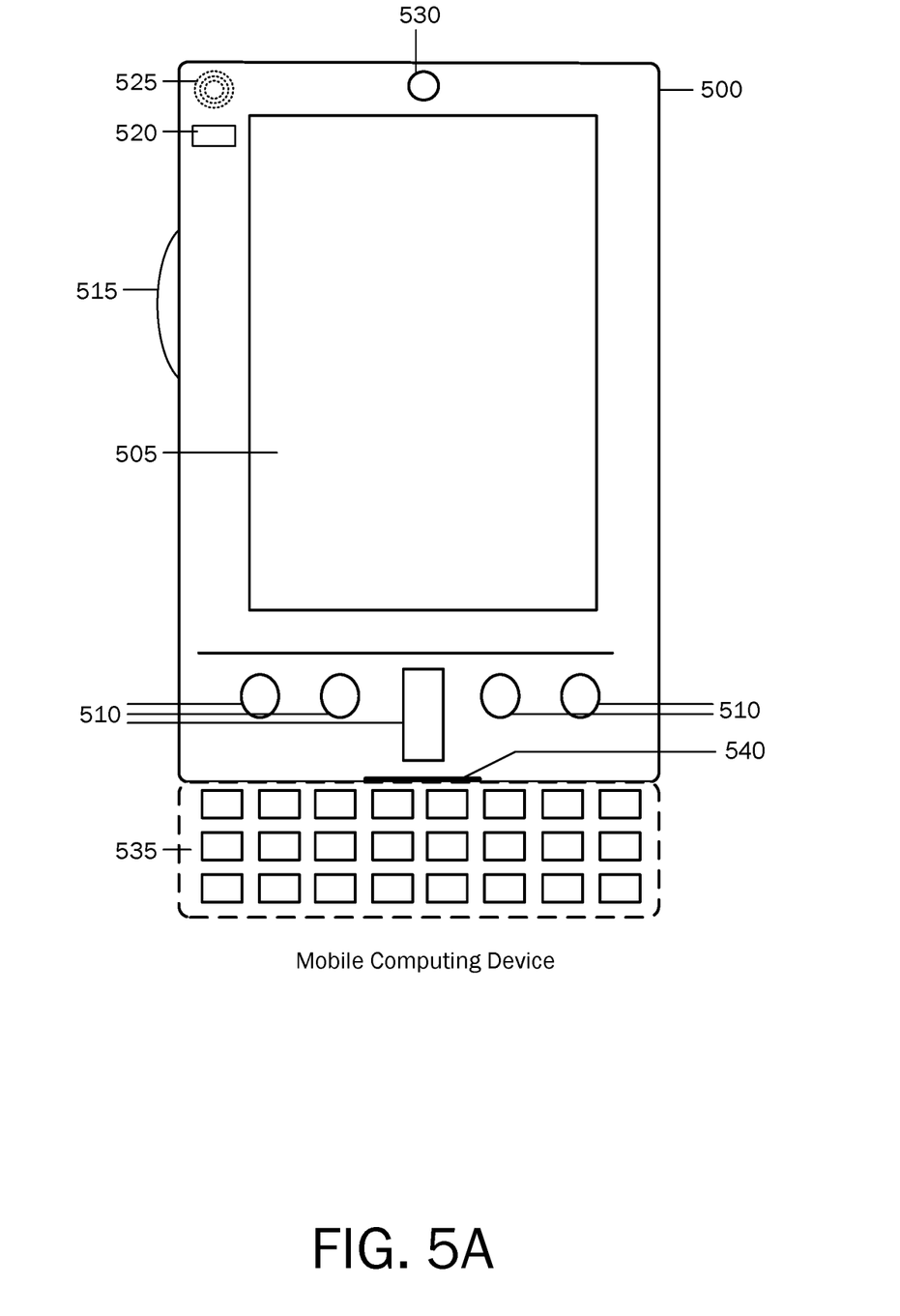
FIGS. 5A and 5B are simplified block diagrams of a mobile computing device with which aspects of the present invention may be practiced.
Figure 5B:
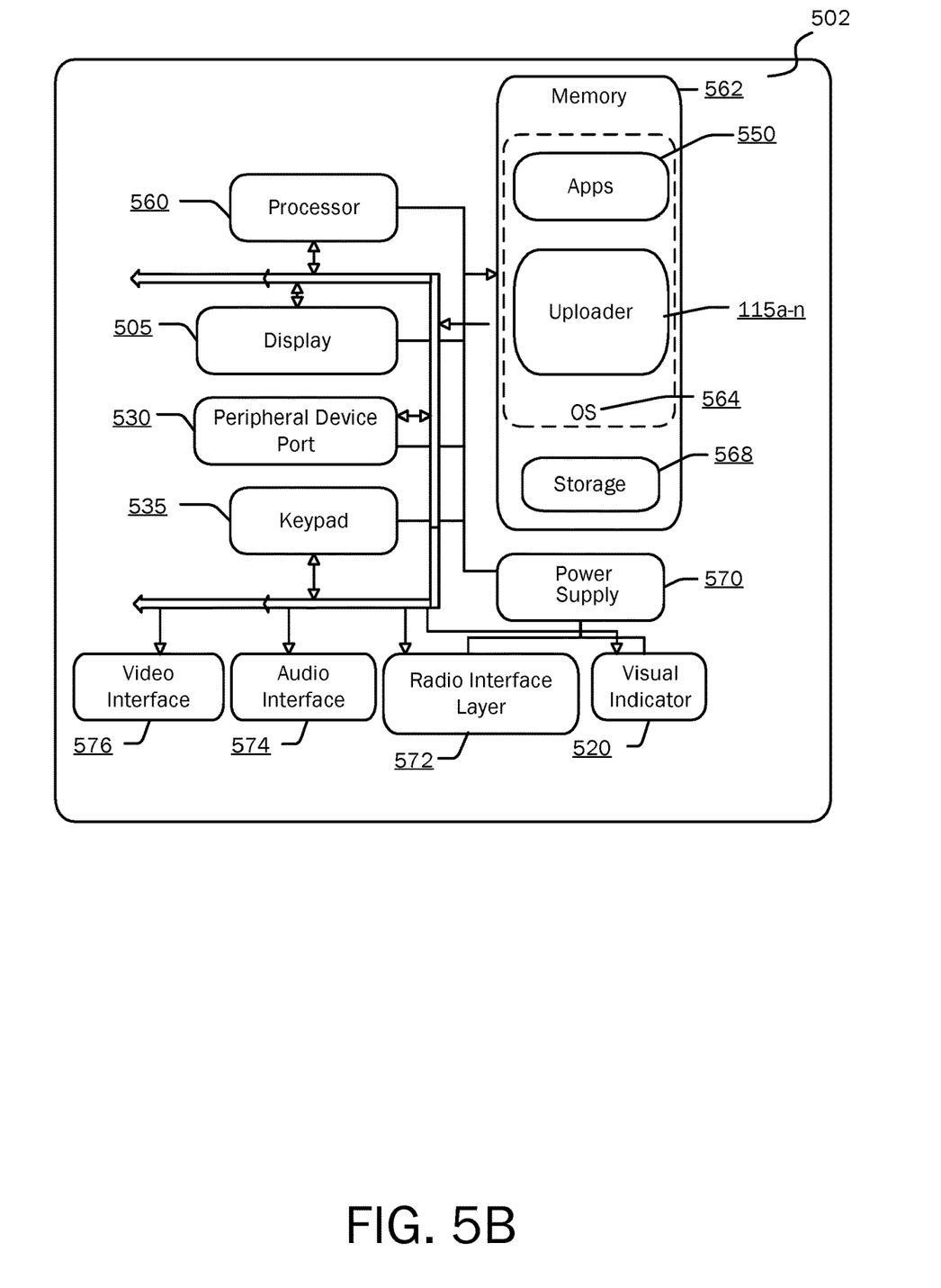
Figure 6:
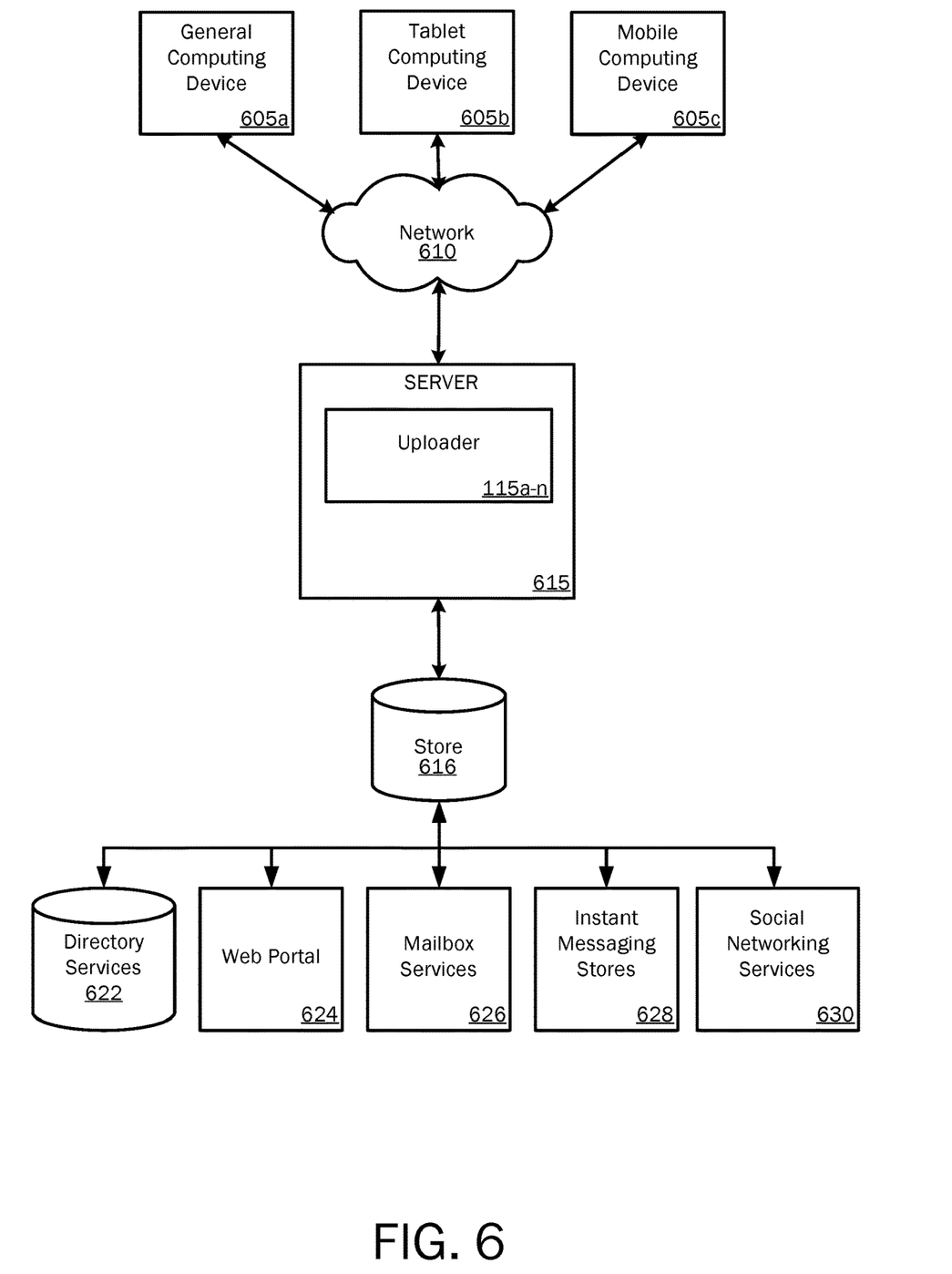
FIG. 6 is a simplified block diagram of a distributed computing system in which aspects of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the computing devices 110, 115, 145, described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing an activity stream across multiple workloads may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media or transmission media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550 may be loaded into the memory 562 and run on or in association with the operating system 564. Examples of the application programs include phone dialer programs, electronic communication applications, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 150 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing the functionality described herein across components of a distributed computing environment. Content developed, interacted with, or edited in association with the applications described above may be stored in different communication channels or other storage types. For example, various documents may be stored using a directory service 622, a web portal 624, a mailbox service 626, an instant messaging store 628, or a social networking site 630. The application 450 (e.g., an electronic communication application) may use any of these types of systems or the like for providing the functionalities described herein across multiple workloads, as described herein. A server 615 may provide the functionality to clients 605A-C and 110a-n. As one example, the server 615 may be a web server providing the application functionality described herein over the web. The server 615 may provide the application functionality over the web to clients 605A-C and 110a-n through a network 125, 610. By way of example, a client computing device 110a-n may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A computer-implemented method for uploading data from a source system to a destination system, comprising:
    receiving a request to upload the data to the destination system, wherein the request includes an instruction to process the data for upload;
    in response to the request, generating a configuration file consistent with the instruction;
    retrieving the requested data;
    determining that a plug-in component is needed to process the retrieved data in accordance with the configuration file;
    accessing the plug-in component;
    processing the retrieved data using the plug-in component to generate processed data, the plug-in component comprising a data transformation plug-in configured to strip undesired data from the data;
    storing the processed data in a memory; and
    uploading the processed data from the memory to the destination system.

2. The computer-implemented method of claim 1, wherein the instruction to process the data for upload includes one or more of an instruction to read the data, an instruction to transform the data and an instruction to export the data.

3. The computer-implemented method of claim 2, wherein the plug-in component includes one or more of a reading plug-in to execute the instruction to read the data, the data transformation plug-in to execute the instruction to transform the data, and an export plug-in to execute the instruction to export the data.

4. The computer-implemented method of claim 3, wherein the reading plug-in causes reading of a specific type of data.

5. The computer-implemented method of claim 3, wherein the data transformation plug-in causes the transformation of the retrieved data from one file type to another file type.

6. The computer-implemented method of claim 3, wherein the export plug-in controls one or more of a quantity of processed data uploaded to the destination system and a frequency of processed data uploaded to the destination system.

7. The computer-implemented method of claim 1, wherein the undesired data comprises personally identifiable information (PII).

8. The computer-implemented method of claim 7, wherein the data transformation plug-in causes the stripping of the PII from the retrieved data by hashing the PII.

9. The computer-implemented method of claim 7, wherein the data transformation plug-in causes the stripping of the PII from the retrieved data by encrypting the PII.

10. The computer-implemented method of claim 1, wherein the source system comprises a data center storing the data in a plurality of data types from a plurality of computing devices.

11. A system for uploading data from a source system to a destination system, comprising:
a memory storing instructions; and
a processor executing the instructions, the execution of the instructions causing the processor to:
receive a request to upload the data to the destination system, wherein the request includes an instruction to process the data for upload;
in response to the request, generate a configuration file consistent with the instruction;
retrieve the requested data;
determine that a plug-in component is needed to process the retrieved data in accordance with the configuration file;
access the plug-in component;
process the retrieved data using the plug-in component to generate processed data, the plug-in component comprising a data transformation plug-in configured to strip undesired data from the data;
storing the processed data in the memory; and
upload the processed data from the memory to the destination system.

12. The system of claim 11, wherein the instruction to process the data for upload includes one or more of an instruction to read the data, an instruction to transform the data and an instruction to export the data.

13. The system of claim 12, wherein the plug-in component includes one or more of a reading plug-in to execute the instruction to read the data, the data transformation plug-in to execute the instruction to transform the data, and an export plug-in to execute the instruction to export the data.

14. The system of claim 13, wherein the reading plug-in causes the processor to read a specific type of data.

15. The system of claim 13, wherein the data transformation plug-in causes the processor to transform the retrieved data from one file type to another file type.

16. The system of claim 13, wherein the export plug-in causes the processor to control one or more of a quantity of processed data uploaded to the destination system and a frequency of processed data uploaded to the destination system.

17. The system of claim 11, wherein the undesired data comprises personally identifiable information (PII).

18. A computer-implemented method for uploading data from a data center to a destination computing system, comprising:
receiving a request at the data center to upload the data to the destination computing system, wherein the request includes an instruction to remove personally identifiable information (PII) from the data prior to upload;
in response to the request,
generating a configuration file consistent with the instruction;
retrieving the requested data;
determining that a data transformation plug-in component is needed to transform the retrieved data in accordance with the configuration file;
accessing the plug-in component;
processing the retrieved data using the plug-in component to strip the PII from the retrieved data;
storing the processed data in a memory; and
uploading the processed data from the memory to the destination computing system.

* * * * *